Jan. 11, 1938.    E. J. LINTNER    2,104,880
SAFETYPIN
Filed July 10, 1936
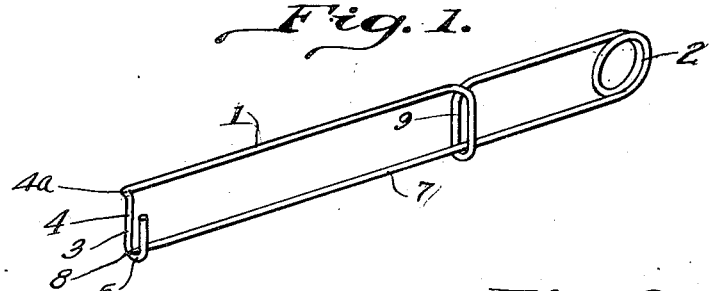
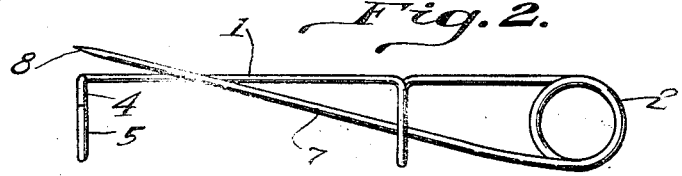
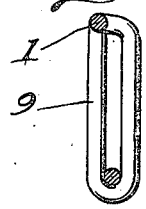
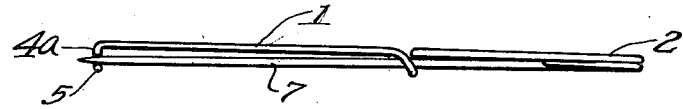
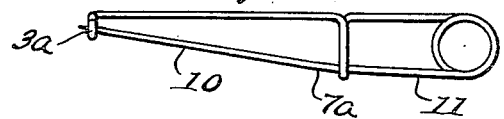
Inventor
Edwin J. Lintner
By W. S. McHowell
Attorney Patented Jan. 11, 1938

2,104,880

UNITED STATES PATENT OFFICE 2,104,880

SAFETYPIN

Edwin J. Lintner, Pittsburgh, Pa.

Application July 10, 1936, Serial No. 89,941

1 Claim. (Cl. 24—161)

This invention relates to improvements in safety pins, the object of the invention being to provide a safety pin in which the resiliently movable pointed arm or shank thereof is normally retained in a position of closure or engagement with respect to the receiving guard of the pin to the end of providing a safety pin which will never assume a dangerous open position of conventional types of safety pins.

Safety pins are quite generally used, as is well known, in the securing and positioning of infants' garments. When the ordinary safety pin is opened, the resilient pointed shank thereof projects a considerable distance beyond the confines of the receiving guard provided on the stationary arm or shank of such a pin. Many distressing accidents are directly attributable to this construction, due to the fact that an infant or small child will grasp such an opened safety pin and will place the same in its mouth with unfortunate results. Such accidents are not infrequent and result in the pin lodging in the tracheal or other bodily passages from which its removal is difficult and often impossible to effect.

It is therefore an object of the present invention to provide an improved safety pin wherein the construction thereof is such that the normal position of the pointed shank of the pin, when not resiliently flexed or stressed, will be within the receiving guard on the stationary arm or shank of the pin.

Another object of the invention resides in the provision of a safety pin which is particularly adapted for use in the securing of infants' garments and wherein the pointed resiliently movable arm or shank of the pin will be positively confined for movement toward and away from the receiving guard on the stationary arm or shank, the construction and position of the resilient pointed arm being such that it will require the application of positive manually applied pressures to said pointed arm to move it to an open position permitting of the passage thereof through fabrics and when said pressure is released, to cause the said pointed arm, through its inherent resiliency, to immediately and automatically return into engagement with the guard.

A still further object of the invention resides in the provision of a self-closing safety pin formed from a single length of bent wire shaped to produce a stationary arm having at one end thereof a spring coil and at its opposite end a receiving guard, the intermediate portion of the stationary arm being provided with a loop or guard in which is confined for movement in a definite plane the resiliently movable pointed arm of the pin, the latter projecting forwardly from the spring coil and having its pointed end normally received within the guard of the stationary arm, the movable arm being related to the spring coil and the guide loop so that the pointed end thereof will be normally positioned in said guard when not under manually applied pressures tending to spring or flex the same.

For a further understanding of the invention, reference is to be had to the following description and the accompanying drawing, wherein:

Fig. 1 is a perspective view of a self-closing safety pin formed in accordance with the present invention;

Fig. 2 is a side elevation thereof disclosing the pointed shank of the pin in its resiliently flexed or open position;

Fig. 3 is a vertical transverse sectional view through the pin and disclosing the guide loop for the movable shank;

Fig. 4 is a top plan view thereof;

Fig. 5 is a side elevation of a slightly modified form of self-closing safety pin;

Fig. 6 is a similar view of a still further modified form.

Referring more particularly to the drawing, and to the form of my invention disclosed in Figs. 1 to 4, the improved safety pin is formed to embody a single length of wire of appropriate diameter bent to provide a stationary arm or shank 1, which terminates at its inner end to produce coil spring convolutions 2 and at its other or outer end in a perpendicularly disposed guard 3. In the form of the invention disclosed in Fig. 1, the arm or shank 1 extends substantially in a straight longitudinal direction, terminating forwardly in the perpendicularly disposed guard 3, which embodies a relatively long branch 4 slightly offset with respect to the shank 1 as at 4a and a shorter upwardly extending parallel branch 5, the branches 4 and 5 being joined by a curved section 6.

Constituting an integral continuation of the coil spring forming convolutions 2 is the resiliently movable arm or shank 7 of the pin which has its forward end pointed as at 8 and normally received within the guard 3. In this normal position, the movable arm or shank 7 extends substantially parallel with the stationary arm or shank 1 and is unflexed or without any substantial tension. That is to say, the coil spring 2 merely serves to exercise sufficient resilient action on the movable arm shank 7 to maintain its pointed end in contact with the curved section 6 of said guard but without otherwise tensioning or stressing the arm 7.

The offset 4a between the guard 3 and the shank 1 is necessary to provide clearance between the resilient arm 7 and the shank 1 for the reception of the clothing through which the arm 7 passes. This offset portion is perpendicular to the arms 1 and 4 and may be of varying length.

However, as shown in Fig. 2, when it is desired to open the pin, then manual pressure is applied to the outer end of the arm or shank 7, contiguous to its pointed end, so that the arm 7 will be flexed and resiliently moved against the tension exercised thereon by the spring 2 out of the guard to assume the open position, permitting of the passage of the arm 7 through the fabrics united by the pin. Following the desired penetration of the fabrics, the movable arm or shank is released and the tension of the spring 2, as well as the normal resiliency of the arm or shank 7 automatically returns the pointed end 8 of said arm or shank to its usual position of closure within the confines of the guard 3.

To confine the resilient flexing of the arm or shank 7 to substantially a single plane and to insure its registration with the guard 3, the stationary arm or shank 1 is looped as at 9 to produce a confined, elongated guide or slot transversely of the pin in which the movable arm or shank 7 is confined for flexing movement. The construction of this guide loop is such that the arm or shank 7 will be retained at all times in the vertical plane of the pin and prevented from being moved transversely of that plane to any material extent, so that following resilient flexure of the arm or shank 7 through manual means, the said arm when released will be automatically guided and returned to the guard 3.

The pin is subject to certain variations in manufacture without departing from its essential features. For instance, as disclosed in Fig. 5, the guard 3a is of shorter length than the guard 3 disclosed in Fig. 1. The length of the guard may be varied according to the size of the pin and any suitable length selected best adapted for the efficient and convenient operation and use of the pin. When the shorter guard is used, as in Fig. 5, the movable arm or shank 7a has its outer portion 10 disposed at a slight angle to the inner coil adjoining portion 11 thereof.

In Fig. 6, another modified form of the invention is disclosed wherein the coil 2 and the guide loop 9, as well as the inner portions of the stationary and movable arms of the pin, are protected by a metallic or other sheathing 12, which provides for the obtaining of a better grip on the pin when it is being used. The sheathing may be decoratively finished in any desired manner to improve the appearance of the pin.

In view of the foregoing, it will be seen that the present invention provides a self-closing safety pin which may be conveniently and readily used in the fastening of infants' and children's garments. By its construction, the pin eliminates the dangers heretofore present in the matter of a child swallowing an open conventional type of safety pin. The construction of the pin comprising the present invention is essentially simple and may therefore be economically manufactured.

What is claimed is:

A safety pin comprising a coil spring and stationary and movable shanks, the outer free end of said movable shank being pointed, a guard provided at the outer end of said stationary shank for the reception of the pointed end of said movable shank, an elongated loop provided on one of said shanks near said coil spring, the other shank being received in said loop whereby said pointed section will be guided in its movement, and a protective sheathing surrounding said coil spring and said loop.

EDWIN J. LINTNER.